UNITED STATES PATENT OFFICE.

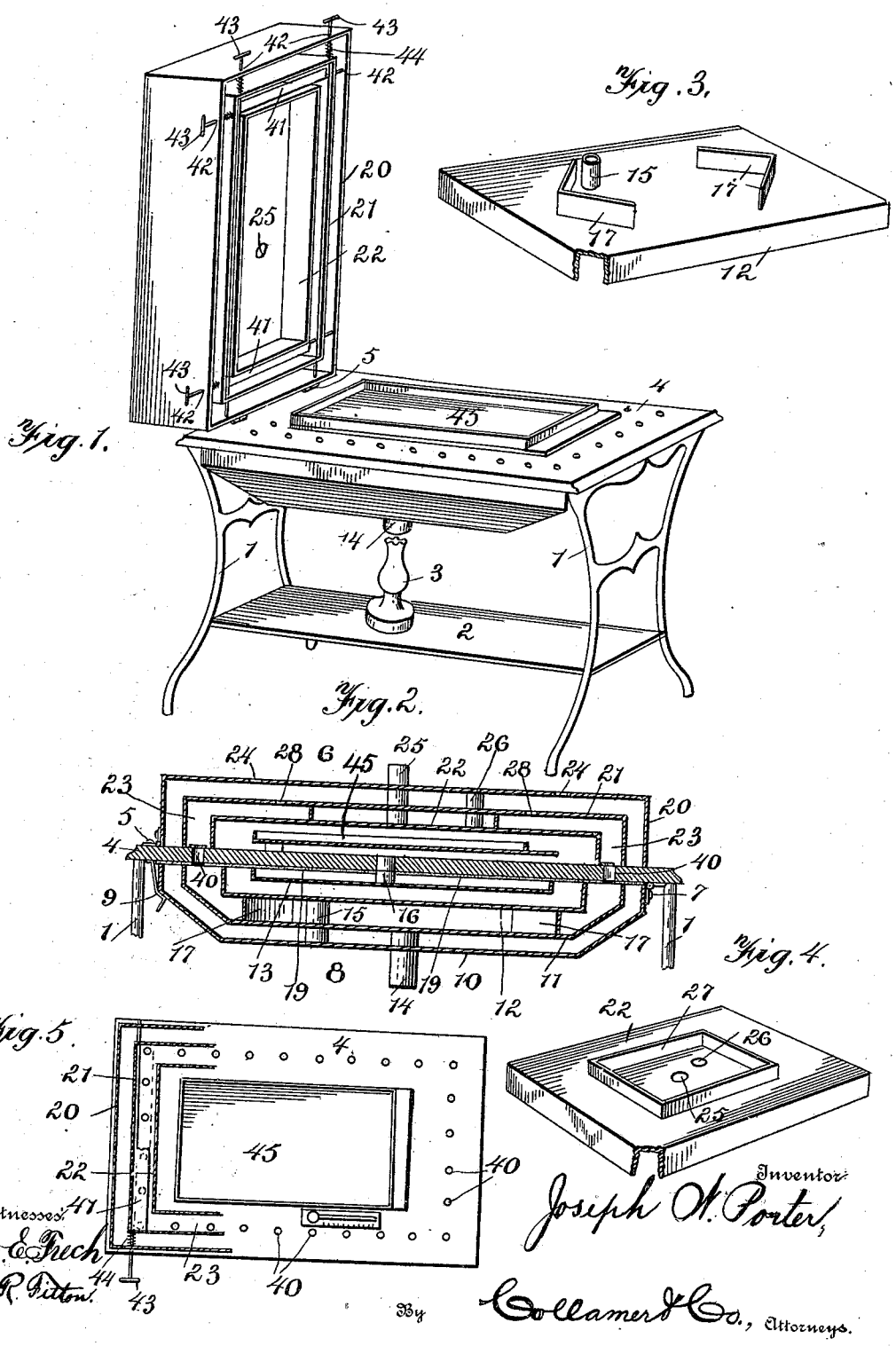

JOSEPH W. PORTER, OF PONCA, NEBRASKA.

INCUBATOR.

SPECIFICATION forming part of Letters Patent No. 669,593, dated March 12, 1901.

Application filed June 11, 1900. Serial No. 19,884. (No model.)

*To all whom it may concern:*

Be it known that I, JOSEPH W. PORTER, a citizen of the United States, and a resident of Ponca, Dixon county, State of Nebraska, have invented certain new and useful Improvements in Incubators; and my preferred manner of carrying out the invention is set forth in the following full, clear, and exact description, terminating with claims particularly specifying the novelty.

This invention relates to the care of live stock, and more especially to incubators; and the object of the same is to produce an improved device of this character.

To this end the invention consists in the construction set forth below and as illustrated in the drawings, wherein—

Figure 1 is a perspective view of this device with the cover raised. Fig. 2 is a longitudinal section omitting the stand. Fig. 3 is a perspective detail of the bottom dead-air chamber. Fig. 4 is a similar detail of the top dead-air chamber. Fig. 5 is a plan view of the base-plate.

Referring to the drawings, 1 is a stand having a shelf 2 for supporting a lamp 3 or other suitable source of heat. The top of the stand forms the base-plate 4 of the entire machine, to which is hinged, as at 5, the cover 6, and to which is hinged, as at 7, the bottom 8, which latter is supported at its free edge by any suitable form of catch 9. These parts are of the desired sizes, shapes, proportions, and materials, but preferably iron for the stand, wood for the base-plate, and wood or paper board for the cover and bottom and for the casings which form the various chambers therein.

It may be well to state here that the heater and the thermometer are not described at great length, because, although preferably used in connection with this device, I do not desire to be limited to any special construction of these features.

The bottom 8 consists of an outer casing 10, an inner casing 11, leaving a dead-air space between these casings, a casing 12, secured within the inner casing and forming a hot-air chamber within the inner casing 11, and, if desired, another casing 13, secured to the base-plate and forming a smaller dead-air space within the outer cold-air space 12. The outer casing 10, the inner casing 11, and the casing of the cold-air space are connected with each other in any suitable way and are supported by the hinge 7 and fastening device 9, while the casing 13 of the smaller or inner dead-air space is supported from and beneath the base-plate 4.

14 is the inlet-pipe, passing through the outer and inner casings directly above the lamp 3. 15 is the ventilator-pipe, passing through both of these casings and also through the casing 12 into the outer cold-air space and continued, as at 16, through the casing 13 of the inner dead-air space and upward through the base-plate 4.

17 in the present instance (see Fig. 3) designates angular partitions between the inner casing 11 and the casing of the outer cold-air space 12, such partitions being so located as to cause the incoming heat to be deflected beneath the casing 12 and to pass upward at its sides.

19 designates strips of asbestos or the like beneath the base-plate 4 and with which the casings make close contact when the bottom is closed.

20 designates the outer casing of the cover, 21 the inner casing thereof, separated from all the walls of the outer casing, so as to leave a dead-air space between, and 22 the innermost casing of the cover, whose walls are similarly separated from those of the inner casing 21, so as to leave a hot-air space between.

The products of combustion or the heat entering the inlet 14 passes upward through a rectangular series of holes 40 through the base-plate 4 and enters the space 23 between the casings 21 and 22, from which it finds an outlet through the apertures 28 in the inner casing 21 and the holes 24 in the outer casing 20. The cold or fresh air warmed by the hot air around it passes in at 16 and finds an outlet through pipe 25, opening through the innermost casing 22 and through both casings 20 and 21.

26 is a glass-covered aperture through all three casings 20, 21, and 22, through which may be seen a thermometer which lies within the egg-chamber.

27 is a partition on the top of the innermost casing 22 and between it and the casing 21 around the passages 25 and 26, but inside the apertures 28.

The various casings in the cover, as in the bottom, are connected with and supported from each other in any suitable manner.

Over each of the four rows of holes 40 in the base-plate is located a damper 41, consisting of a strip whose body may never completely close the holes, whose ends are journaled in bearings 42 through the three casings of the cover and one of whose extremities has a handle 43, and 44 is a spring between one bearing and a shoulder on this strip, whereby the latter is held in any position to which it is turned.

45 is the egg-tray, supported by any suitable means slightly above the base-plate, which tray is of such dimensions that the innermost casing 22 will entirely surround it when the cover is let down.

The parts constructed as described being properly assembled and the eggs placed upon the tray, with or without suitable means within the egg-chamber for creating moisture as believed to be necessary, the products of combustion pass upward along the inlet 14, through both the outer and inner casings 10 and 11 of the bottom, strike beneath the casing 12 of the cold-air space between its partitions 17, are deflected laterally thereby, and pass upward by its sides and through the apertures 40 of the base-plate 4, thus passing completely around the egg-chamber through apertures controlled by the dampers 41. The casing 12 of the cold-air space (together with the casing 13 of the dead-air space, if employed) prevents an excessive degree of heat at the center of the base-plate 4, immediately beneath the egg-tray. The cover being closed, as shown in Fig. 2, the products of combustion coming through the holes 40 in the base-plate pass into the space 23 between the casings 21 and 22, up over the same outside the partition 27, out the apertures 28 into the space between the two outer casings, and then out the outlets 24. It will thus be seen that the spaces between the two outer casings in both the cover and the bottom form practically a dead-air space surrounding the space for hot air, whereby the latter is not affected by rapid changes in temperature or gusts of wind. The cold or fresh air passes up through pipe 15 into the chamber between the casings 12 and 13, is warmed by the heat in the space next outside the casing 12, and passes thence up along pipe 16, through the base-plate 4, and into the egg-chamber beneath the egg-tray 45. Spreading out thereunder it rises through and past the edges of this tray within the innermost casing 22 of the cover and finds its exit along the pipe 25 through the cover-casings 22, 21, and 20 to the open air. It will thus be seen that while the passage for direct heat is surrounded exteriorly by a space to prevent the effect thereon of quick changes in temperature the passage for fresh air heated indirectly is between the heat-passage and the egg-chamber, so that if the heat itself should fluctuate such fluctuation would not be communicated directly to the eggs. Moreover, the attendant is at liberty to view the thermometer through the aperture 26 and set the various dampers accordingly. This does not require opening the device, although that can be readily accomplished by raising the cover or lowering the bottom, or both.

What is claimed as new is—

1. In an incubator, the combination with a base-plate provided with a series of holes near its periphery, an egg-tray supported above this plate and of smaller contour than said series of holes, and a source of heat; of a cover and bottom for said plate, an air-space in the bottom below the egg-tray and having an inlet, a heat-space in the bottom around and below the air-space, its inlet communicating with the source of heat and its outlet being through said holes, an air-space in the cover above the egg-tray and having an outlet, and a heat-space surrounding this air-space and having an outlet of its own, its inlet being through said holes, all substantially as described.

2. In an incubator, the combination with a base-plate provided with a series of holes near its periphery, an egg-tray supported above this plate and of smaller contour than said series of holes, and a source of heat; of a cover and bottom for said plate, an air-space in the bottom below the egg-tray and having an inlet, a heat-space in the bottom around and below the air-space, its inlet communicating with the source of heat and its outlet being through said holes, an air-space in the cover above the egg-tray and having an outlet, a heat-space formed by a casing surrounding that of the air-space and having holes in its top, and an outer dead-air space formed by another casing surrounding the one just named and having outlet-holes in its top, substantially as described.

3. In an incubator, the combination with a base-plate provided with a series of holes near its periphery, an egg-tray supported above this plate and of smaller contour than said series of holes, and a source of heat; of a cover and bottom for said plate, an air-space in the bottom below the egg-tray and having an inlet, a heat-space in the bottom around and below the air-space, its inlet communicating with the source of heat and its outlet being through said holes, a second air-space in the bottom around the heat-space, an air-space in the cover above the egg-tray and having an outlet, and a heat-space surrounding this air-space and having an outlet of its own, its inlet being through said holes, substantially as described.

4. In an incubator, the combination with a base-plate provided with a series of holes near its periphery, an egg-tray supported above this plate and of smaller contour than said series of holes, and a source of heat; of a cover and bottom for said plate, an air-space in the bottom below the egg-tray and having an inlet, a heat-space in the bottom around and below the air-space, its inlet communicating with the source of heat and its outlet being through said holes, a second air-space in the bottom around the heat-space, a dead-air space within the inner air-space and next the base-plate, an air-space in the cover above the egg-tray and having an outlet, a heat-space formed by a casing surrounding that of the air-space and having holes in its top, and an outer air-space formed by another casing surrounding the one just named and having outlet-holes in its top, substantially as described.

5. In an incubator, the combination with a base-plate having a series of holes near its periphery, an egg-tray supported by the center of said plate, and a cover having suitable passages and outlets; of a support for the base-plate, a bottom beneath the latter, said bottom comprising a series of casings graduated in size and supported out of contact with each other so as to form an outer dead-air space, a hot-air space next within and communicating with said series of holes, and a fresh-air space next within and communicating through the center of the base-plate with the egg-chamber, substantially as described.

6. In an incubator, the combination with a base-plate having a series of holes near its periphery, an egg-tray supported by the center of said plate, a cover having suitable passages and outlets, and dampers journaled in the cover above said holes in the base-plate and having handles projecting to the exterior; of a support for the base-plate, a bottom beneath the latter, said bottom comprising a series of casings graduated in size and supported out of contact with each other so as to form an outer dead-air space, a hot-air space next within and communicating with said series of holes, and a fresh-air space next within and communicating through the center of the base-plate with the egg-chamber, substantially as described.

7. In an incubator, the combination with a base-plate having a series of holes near its periphery, an egg-tray supported by the center of said plate, and a cover having suitable passages and outlets; of a support for the base-plate, a bottom hinged at one end beneath the latter, means for detachably supporting it at the other end, said bottom comprising a series of casings graduated in size and supported out of contact with each other so as to form an outer dead-air space, a hot-air space next within and communicating with said series of holes, and a fresh-air space next within and communicating through the center of the base-plate with the egg-chamber, substantially as described.

8. In an incubator, the combination with a base-plate having a series of holes near its periphery, an egg-tray supported by the center of said plate, and a cover having suitable passages and outlets; of a support for the base-plate, a bottom hinged at one end beneath the latter, means for detachably supporting it at the other end, said bottom comprising a series of casings graduated in size and supported out of contact with each other so as to form an outer dead-air space, a hot-air space next within and communicating with said series of holes, and a fresh-air space next within and communicating through the center of the base-plate with the egg-chamber, a hot-air-inlet pipe through the two outer casings, partitions on the third casing for deflecting the inflowing hot air, a cold-air-inlet pipe through the three outer casings, and a fourth casing secured to the bottom of the base-plate and forming a dead-air space between the cold-air chamber and said plate, substantially as described.

9. In an incubator, the combination with a base-plate having a series of holes near its periphery, a source of heat, means for leading the heat upward through said holes, an egg-tray surrounded by the holes, and means for leading fresh heated air through the base-plate beneath the tray; of a cover comprising a series of nested casings supported and separated from each other, the innermost having a ventilating-pipe of its own leading upward through the other casings and also having on its exterior a partition the next casing having a series of hot-air outlets outside said partition, the space between these two casings registering with the holes in the base-plate, the outermost casing having proper exit-apertures, and a glass-covered pipe extending through all casings and through which may be seen a thermometer within the egg-chamber, as and for the purpose set forth.

10. In an incubator, the combination with a base-plate having a series of holes near its periphery, a source of heat, means for leading the heat upward through said holes, and an egg-tray supported by the plate and of smaller contour than the series; of a removable cover comprising a series of nested casings supported and separated from each other and whereof the innermost casing coacts with the base-plate to form an egg-chamber, the space just outside said casing registering with said series of holes and having an outlet, and a series of dampers each having its shaft journaled in the nested casings, its handle exterior to the cover, and its body standing over one row of holes, as and for the purpose set forth.

In testimony whereof I have hereunto subscribed my signature this the 26th day of May, A. D. 1900.

JOSEPH W. PORTER.

Witnesses:
C. H. SCHELL,
M. I. MELLON.